March 21, 1961 T. VUCHINAS 2,975,447
TIRE CLEANING DEVICE
Filed Sept. 9, 1958
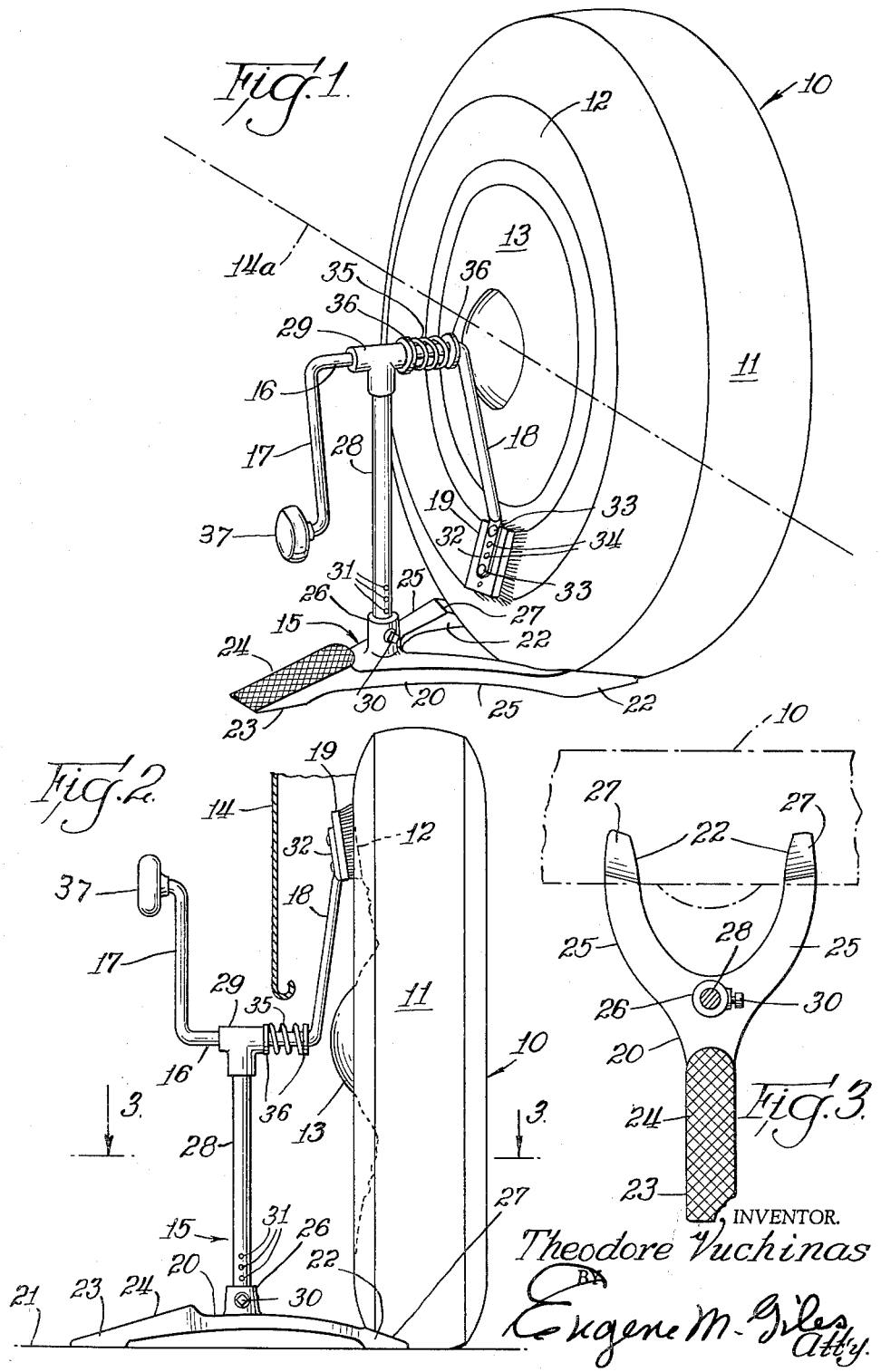
INVENTOR.
Theodore Vuchinas
BY
Eugene M. Giles
Atty.

United States Patent Office 2,975,447
Patented Mar. 21, 1961

2,975,447
TIRE CLEANING DEVICE
Theodore Vuchinas, 3831 Hollywood Blvd., Brookfield, Ill.
Filed Sept. 9, 1958, Ser. No. 760,007
8 Claims. (Cl. 15—21)

This invention relates to tire cleaning devices and has reference more particularly to improvements therein by which such device is readily applicable to a tire in upright position on an automobile for cleaning the outer side wall thereof.

White side wall tires are used extensively on automobiles because they enhance the appearance of the car and, as they are unsightly unless the exposed side walls are clean, it is desirable to clean them frequently. However the cleaning thereof is quite difficult as fender portions of present-day automobiles are usually extended so far over substantial portions of the side walls that only a part of the tire side wall may be reached for cleaning at one time by present tire cleaning facilities.

On this account it is usually necessary to clean the part of the tire side wall which is exposed below the fender and then move the car forward or rearwardly in order to expose and clean other portions thereof, and this may be necessary to be repeated a number of times for thorough cleaning.

The present invention overcomes this problem by providing a portable tire cleaning device which is conveniently applicable at the exposed side of the tire in proper position for cleaning the tire side wall and having a swinging arm with cleaning element thereon which is operable around the entire side wall face to reach the unexposed portions as well as the exposed portions for thorough cleaning thereof in a single operation without moving the car.

The principal objects of the invention are to provide a portable tire cleaning device which is conveniently applicable in proper position in front of an upright tire to clean the side wall thereof; to permit the cleaning element to reach and clean the entire side wall face of the tire in a single operation thereof without interference by overhanging portions of the automobile fender; to permit the device to be readily centered with the tire so that the cleaning element operates in a circular path coincidental with the circular side wall face of the tire; to insure adequate pressure of the cleaning element against the side face of the tire to insure proper cleaning thereof; and to provide a tire side wall cleaning device which is simple, readily manufactured at low cost and readily placeable with certainty in proper position to clean the tire side wall; these and other objects being accomplished as pointed out more particularly hereinafter and as shown in the accompanying drawing in which:

Fig. 1 is a perspective view of a device embodying the present invention and shown in cleaning position at the side of a tire;

Fig. 2 is a view of the cleaning device and tire of Fig. 1 looking directly at the front of the tire and showing in section a depending portion of the fender of the car as it commonly overhangs the side of the tire; and Fig. 3 is a sectional view of the tire cleaning device of Fig. 2 taken on the line 3—3 thereof and showing in broken lines a fragmentary portion of the tire to which the cleaning device is applied.

Referring to the drawing the reference numeral 10 indicates a tire in the upright position of installation on an automobile and having a conventional tread 11 and side wall 12, the latter of which is usually of white rubber for appearance. As commonly made, each side of the tire is provided with a white side wall 12 and the tire may be reversed to expose either side thereof, but the inner side is sufficiently concealed from observation that soiling thereof does not detract from the appearance of the car and on that account it is only the outer side wall of the tire that ordinarily requires cleaning.

Such tires are mounted on a wheel body (not shown) which has a rim therearound to accommodate the tire, and the wheel body is attached in a rotatable manner to a wheel spindle or secured to the end of a rotatable axle, and the outer side of the wheel body has a cover or disc 13 attached thereto and is usually of ornamental or attractive design, all of which is well known in the art.

In present day cars fenders usually overlie the tires and extend down at the outer side of the tires to a substantial extent so that a considerable portion of the side wall of the tire is concealed and not conveniently accessible, an example of such depending portion of the fender being represented at 14 in Fig. 2 and the bottom limit thereof indicated by the broken line at 14a in Fig. 1.

This however is only representative as the particular manner and extent to which the fenders extend downwardly at the outer side of the tire varies with different makes of automobiles and also varies at the front and rear wheels but it is generally sufficient in all cases to preclude convenient access to the upper portions of the tire side walls for cleaning thereof.

For cleaning the outer side walls 12 of the tires in accordnace with the present invention without interference by the depending fender portion 14, a stand may be employed, which is indicated as a whole by the reference numeral 15, which supports a rotatable spindle 16 in a position directly in front of the center of the tire and this spindle 16 which is rotatable by a hand operated crank 17 at the outer end is provided at its inner end with a radially extending arm 18 having a cleaning element 19 thereon which swings in a circular path around the axis of rotation of the spindle 16 so as to have wiping engagement with the entire side wall 12 in the circular sweep thereof for cleaning the side wall.

The swinging arm 18 and cleaning element 19 are arranged so that the path of movement thereof is near enough to the outer side wall of the tire 10 to have ample clearance behind the depending portion 14 of the fender so that the latter does not interfere therewith and thus the device of this invention is adapted to clean the side wall of a tire installed on an automobile without any necessity of moving the automobile by merely setting the device in proper position at the side of the tire and turning the handle or crank 17 a sufficient number of times.

The stand 15 is provided with a base 20 by which it is readily located and held in the required position for the white side wall cleaning operation and for this purpose has three point support on the floor, ground or other surface on which the automobile and tire 10 thereof happens to be supported at the time of the cleaning operation, all of which said surfaces are referred to comprehensively hereinafter as ground and represented in Fig. 2 of the drawing by the line 21. Two such points of support are in the form of laterally spaced feet 22 which are located at one side of the stand 15 and the other point of support being at the opposite side of the stand and in the form of a foot 23 at the outer end of a step plate 24 on which the foot of the operator is placed for holding the device positively in position in the tire cleaning operation.

To provide this three point support base, the latter is preferably in the form of a Y, the fork of which provides two divergent arms 25 at the outer ends respectively of which the feet 22 are located, and the leg of the Y provides the step plate portion 24, and at the place of intersection of the arms 25 and step plate portion 24 a socket 26 extends vertically upward from the base for a purpose hereafter explained.

The outer ends of the arms 25 have top faces 27 sloped to the arm extremities to provide flat wedge shaped ends as best shown in Fig. 2 and slightly tilted outward one another as indicated in Fig. 3 and spaced apart from one another so that they may be inserted between the tire and the tire supporting surface or ground 21 at the opposite extremities of the arcuate portion of the tire tread which rests on the ground, as indicated in all three figures of the drawing, and when thus inserted in this position the placing of the operator's foot on the step plate 24 holds the stand firmly and positively in the position determined by the inserting of the foot portions 22 underneath the tire.

The socket 26 is adapted to accommodate the lower end of a post 28 which has a fitting 29 secured thereon at its upper end providing a bearing for the spindle 16 and this post is adapted to hold the spindle in line with the axis of rotation of the wheel and tire and thus at the center of the circular expanse of the white side wall 12.

Tires differ in diameter and accordingly require the locating of the spindle 16 at different elevations depending upon the tire diameter and accordingly the post is adjustable to different elevations in the socket 26, and for this purpose the socket 26 is provided with a set screw 30 and the lower end of the post 28 may have a series of openings 31 to receive the inner end of the set screw 30 for holding the post in the selected position of adjustment with the spindle 16 pointed in the proper direction. These openings 31 are located and spaced apart according to conventional tire diameters and accordingly by selecting the appropriate opening 31 corresponding to the diameter of the particular tire to be cleaned and engaging the set screw 30 therein the proper elevation of the spindle 16 for the particular cleaning operation is established.

The cleaning element 19 is preferably in the form of a brush detachably secured to a flattened portion 32 of the outer end of the arm 18 and this flattened outer end portion 32 is bent outwardly to a position of proper angularity so that the wiping or scrubbing faces of the brush 19 corresponds to the transverse slope of the side wall 12 of the tire for certainty of contact of the brush across in the width of the side wall 12.

Inasmuch as the inside diameter of tires vary, the distance of the brush 19 from the axis of the spindle 16 may be required to vary accordingly, and for this purpose the brush may be secured to the flattened end 32 of the arm 18 by threaded members 33 and the flattened end provided with a series of spaced openings 34 to accommodate these threaded members to permit adjustment of the brush at the required distances from the axis of the spindle 16.

It is essential in the cleaning operation of the side wall 12 that the brush be held firmly thereagainst and for this purpose the spindle is slidable lengthwise in the bearing 29 and the portion of the spindle beyond the inner end of the bearing is encircled by a spring 35 interposed between washers 36 which bear respectively against the inner end of the bearing 29 and the angularly disposed arm 18 at the inner end of the spindle 16, this spring being arranged so that when the tire cleaning device is located in cleaning position at the outer side of the tire the spring 35 will be compressed sufficiently to insure positive cleaning pressure of the brush against the side wall of the tire throughout the movement of the brush around the tire side wall.

Generally, the brush is supplied with water and usually also with an appropriate cleaning compound for the cleaning operation, and clear water may be supplied thereto by a hose or otherwise for the final rinsing operation and the crank arm 17 is preferably provided at its outer extremity with a rotatable knob 37 thereon for convenient manipulation of the crank.

Thus in the cleaning operation of the tire the base 20 is positioned with the two wedge ends 22 thereof underneath the tire at opposite extremities of the tread portion which rests on the ground 21, and these ends 22 thus serve as indexing means by which the device is located positively in the correct position at the side of the tire for wiping operation of the brush 19 therearound, and by placing the foot on the tread plate portion 24 the device is positively and securely held against displacement from such proper position throughout the tire cleaning operation.

While I have shown and described my invention in a preferred form, I am aware that various changes and modifications may be made therein without departing from the principles of the invention, the scope of which is to be determined by the appended claims.

What is claimed is:

1. A tire side wall cleaning device comprising a cleaning element supporting standard having at the lower end thereof a ground engaging base by which the standard is supported in a position extending upwardly from the ground, said base being provided with fork means projecting outwardly therefrom at one side of the standard and providing a pair of laterally spaced fork arms which are insertable between the ground and laterally spaced bottom portions of an upright tire to locate the standard in a predetermined upright position at one side of the tire, and the base being provided with a step part projecting outwardly therefrom at the opposite side of the standard and having an upwardly presented top face for reception of the foot of a person thereon in downward pressing engagement thereagainst to hold the base firmly against the ground, said standard having a cleaning element supported thereon and rotatable about an axis which extends crosswise of the standard toward the side thereof at which the fork means projects outwardly from the base, said axis being spaced equidistantly from said laterally spaced fork arms at an elevation above the base, and means by which the cleaning element is rotatable about said axis in an upright plane at said side of the tire.

2. A device in accordance with claim 1 including a spring for biasing the cleaning element outwardly from the standard into firm cleaning engagement with the side wall of the tire, said spring being operable to bias the cleaning element outwardly from the standard at the side thereof from which the fork means projects outwardly from the base.

3. A device in accordance with claim 1 including means for adjusting said axis with respect to said fork arms and thereby enable general collinearity of said axis with the axis of rotation of the tire.

4. A tire cleaning device comprising a ground engaging base, said base including spaced wedging projections extending outwardly from the base at one side thereof and an operator foot rest extending outwardly from the base at the opposite side thereof, said projections being adapted for insertion between the ground and a tire supported thereon, a standard extending upwardly from said base at a place between said one side and said opposite side of the base and a bearing carried by the upper portion of said standard, an arm rotatably supported in said bearing, said arm having a first end portion extending generally radially with respect to the axis of said bearing and an operator actuated crank arm formed on the other end thereof, a cleaning element carried by said first end portion and positioned to describe a circular cleaning motion during rotation of said operator crank arm, the circle described by said cleaning element during such rotary motion being spaced between the outer ends of said projections and said standard.

5. The structure as set forth in claim 4 wherein said standard is vertically adjustable with respect to said base.

6. The structure of claim 4 wherein said cleaning element is radially adjustable on said end portion.

7. The structure as set forth in claim 4 characterized by and including a spring positioned between said end portion and said bearing and constructed and arranged to bias said end portion and said cleaning element outwardly away from said standard.

8. A portable device applicable at the side of a ground supported upright automobile tire to clean the side wall thereof, the said device comprising supporting means adapted to rest on the ground and provided with an upwardly projecting standard having a swinging arm mounted thereon at an elevation to swing at one side of the standard about an axis transverse to the standard and having a cleaning element thereon spaced from said axis for swinging movement with the side arm in a circular path for cleaning application to the side wall of the tire, the said supporting means being provided with fork means projecting outwardly therefrom at one side of the standard and providing a pair of spaced apart indexing members below and projecting outwardly beyond the path of rotation of said arm which are receivable underneath the bottom portion of such aforesaid ground supported upright automobile tire to locate the device in cleaning position at the side of the tire and the supporting means having step means projecting outwardly therefrom at the opposite side of the standard and having an upwardly presented top face for reception of the foot of a person thereon in downward pressing engagement thereagainst to hold the supporting means firmly against the ground.

References Cited in the file of this patent

UNITED STATES PATENTS

| | | |
|---|---|---|
| 426,739 | Pudan | Apr. 29, 1890 |
| 2,832,085 | Chamberlain | Apr. 29, 1958 |